(12) United States Patent
Kavanagh et al.

(10) Patent No.: US 12,733,769 B2
(45) Date of Patent: Sep. 15, 2026

(54) COOKING APPARATUS

(71) Applicant: 2791673 Ontario Inc., Millbrook (CA)

(72) Inventors: Scott Kavanagh, Stouffville (CA); Steve Tallis, Millbrook (CA)

(73) Assignee: 2791673 Ontario Inc., Millbrook (CA)

( * ) Notice: Subject to any disclaimer, the term of this patent is extended or adjusted under 35 U.S.C. 154(b) by 371 days.

(21) Appl. No.: 18/382,861

(22) Filed: Oct. 23, 2023

(65) Prior Publication Data

US 2024/0374081 A1 Nov. 14, 2024

(30) Foreign Application Priority Data

May 9, 2023 (CA) ................................ CA 3199107

(51) Int. Cl.
*A47J 37/07* (2006.01)
*A23B 4/052* (2006.01)

(52) U.S. Cl.
CPC ........... *A47J 37/0704* (2013.01); *A23B 4/052* (2013.01); *A47J 37/0786* (2013.01)

(58) Field of Classification Search
CPC .... A47J 37/0704; A47J 37/0786; A23B 4/052
USPC ........................................................ 126/25 R
See application file for complete search history.

(56) References Cited

U.S. PATENT DOCUMENTS 2,237,081 A 4/1941 Owens
3,489,132 A * 1/1970 West .................. A47J 37/0704 126/25 R
3,776,127 A * 12/1973 Muse ...................... A47J 37/00 99/425
3,851,639 A 12/1974 Beddoe
4,566,429 A * 1/1986 Williams ............ A47J 37/0704 126/29
5,086,752 A * 2/1992 Hait .................... A47J 37/0704 126/25 R (Continued)

FOREIGN PATENT DOCUMENTS

KR 200493461 Y1 4/2021

OTHER PUBLICATIONS

Arteflame, Manual Euro 40 Grill Tall Base (2021) (16 pages).

(Continued)

*Primary Examiner* — Avinash A Savani
(74) *Attorney, Agent, or Firm* — Harris Beach Murtha Cullina PLLC

(57) ABSTRACT

A cooking apparatus is disclosed that allows for independent and simultaneous cooking styles at different temperatures. The cooking apparatus comprises a lower enclosure comprising a cooking chamber; and an upper portion arranged above the lower enclosure and comprising a grilling unit. The grilling unit comprises a base that is coupled to an upper region of the lower enclosure; an upper heat source region positioned within the base; and a grilling surface arranged above the upper heat source region. The base of the upper portion comprises an overhang that extends around a circumference or perimeter of the upper region of the lower enclosure, and the overhang comprises one or more air vents distributed along the overhang for providing airflow to the upper heat source region. The grilling unit and the cooking chamber are operable independently and simultaneously.

23 Claims, 11 Drawing Sheets

(56) References Cited

U.S. PATENT DOCUMENTS

| | | | | |
|---|---|---|---|---|
| 7,984,709 | B1 * | 7/2011 | Byrnes ................ | A47J 37/0704 126/250 |
| 9,464,811 | B2 | 10/2016 | Coffman | |
| 11,058,255 | B2 | 7/2021 | Seong | |
| 2006/0260599 | A1 * | 11/2006 | Butt .................... | A47J 37/0786 126/25 R |
| 2021/0404663 | A1 | 12/2021 | Strange | |
| 2022/0133088 | A1 | 5/2022 | Lewis | |
| 2023/0042374 | A1 | 2/2023 | Kobryn et al. | |

OTHER PUBLICATIONS

How the Wild Fire 4-in-1 Grill Works, YouTube Video, http://www.youtube.com/watch?v=XNzF16Gs6zQ.
Jospher Combo CVJ Manual, CVJ-050-2-HJX-25 (Mar. 2021)(2 pages).
Pit Boss Memphis Ultimate 2.0 Grill Manual (2021) (86 pages).
What Comes in the Box and Setup, https://www.youtube.com/watch?v=409iLgpBLKA, (Sep. 21, 2023).
Wild Fire 4 in 1 All-in-One Cooking Platform, https://www.wildfire4in1.com (Sep. 21, 2023) (12 pages).

* cited by examiner

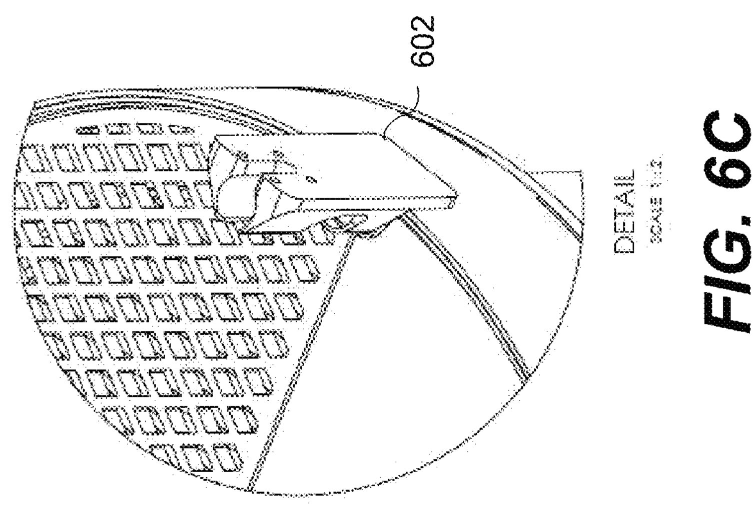
FIG. 6C
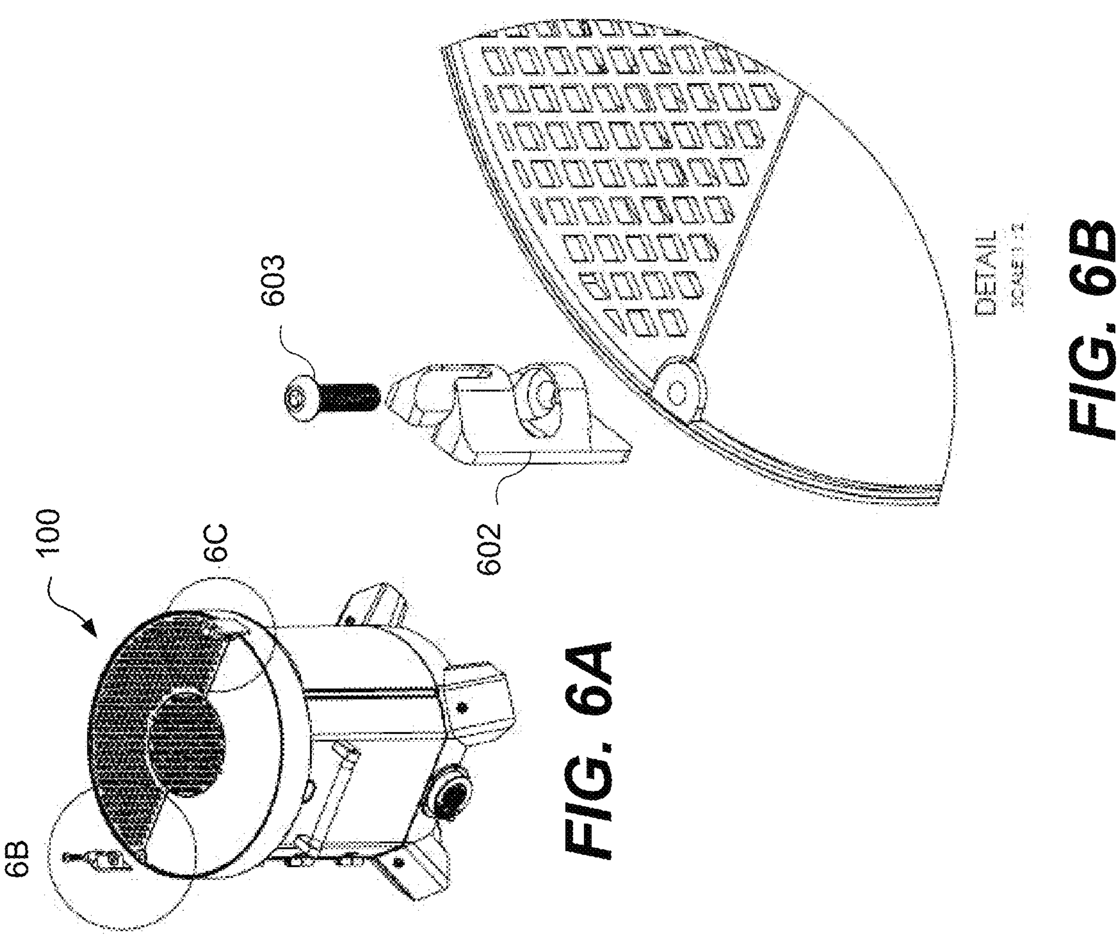
FIG. 6B
FIG. 6A

7B

COOKING APPARATUS

CROSS-REFERENCE TO RELATED APPLICATIONS

This application claims priority to Canadian Application No. 3,199,107 filed on May 9, 2023, which is incorporated herein by reference in its entirety.

TECHNICAL FIELD

The present disclosure relates to a cooking apparatus, and in particular a cooking apparatus that can be used for multiple types of cooking methods.

BACKGROUND

People who cook outdoors often utilize multiple types of appliances to cook different types of meals. For example, people may wish to cook some foods in a smoker, and other foods on a barbeque or grill. Accordingly, should people wish to use different cooking methods, they must buy and store multiple appliances, which requires a large footprint. Moreover, for each appliance users are limited to cooking low and slow (e.g. a smoker) or hot and fast (e.g. barbeque and grill). While attempts have been made to combine appliances for selling as a single unit, such products are generally a mere aggregation of appliances and therefore still require a large footprint.

Accordingly, an improved cooking apparatus remains highly desirable.

SUMMARY

In accordance with one aspect of the present disclosure, a cooking apparatus is disclosed, comprising: a lower enclosure comprising a cooking chamber; and an upper portion arranged above the lower enclosure and comprising a grilling unit, the grilling unit comprising: a base that is coupled to an upper region of the lower enclosure; an upper heat source region positioned within the base; and a grilling surface arranged above the upper heat source region; wherein the base of the upper portion comprises an overhang that extends around a circumference or perimeter of the upper region of the lower enclosure, and the overhang comprises one or more air vents distributed along the overhang for providing airflow to the upper heat source region, and wherein the grilling unit and the cooking chamber are operable independently and simultaneously.

In some aspects, the upper heat source region comprises a basket configured for receiving a fuel source.

In some aspects, the fuel source comprises wood or charcoal.

In some aspects, the upper region of the lower enclosure comprises thermal insulation to limit heat transfer between the base and the cooking chamber.

In some aspects, the cooking apparatus further comprises a drip shield configured to direct run-off from the grilling surface away from the one or more air vents.

In some aspects, the grilling unit further comprises a grate disposed between the upper heat source region and the grilling surface.

In some aspects, the grilling surface comprises one or more removable grilling surface portions.

In some aspects, the cooking apparatus further comprises a lower enclosure heat source region in a lower portion of the cooking chamber.

In some aspects, the cooking chamber is configured for smoking food.

In some aspects, the lower enclosure heat source region comprises a fuel box for receiving wood or charcoal.

In some aspects, the cooking chamber further comprises a diffuser arranged above the lower enclosure heat source region.

In some aspects, the lower enclosure comprises an inlet and outlet air damper coupled to the cooking chamber.

In some aspects, the lower enclosure comprises an outer wall, and wherein the cooking chamber is separated from the outer wall by an air gap surrounding the cooking chamber.

In some aspects, the cooking apparatus further comprises a plurality of castors arranged at a bottom portion of the lower enclosure, and wherein the plurality of castors are configured to be raised and lowered.

In some aspects, the grilling surface provides 600 to 850 square inches of grilling space.

In some aspects, the cooking chamber comprises one or more shelves.

In some aspects, the one or more shelves provide 1100 to 1300 square inches of cooking space.

In some aspects, the grilling surface comprises one or more attachment points for installation of one or more accessories.

In some aspects, the attachment points are configured for receiving an attachment bracket, and the one or more accessories are configured to be coupled to the attachment bracket.

In some aspects, the one or more accessories comprise one or more of a rotisserie accessory and a swing-away griddle platform.

In some aspects, the grilling surface comprises a plancha grilling portion.

In some aspects, the grilling surface comprises a grill grate.

In some aspects, the grilling surface comprises a plancha grilling portion and a grill grate.

BRIEF DESCRIPTION OF THE DRAWINGS

Further features and advantages of the present disclosure will become apparent from the following detailed description, taken in combination with the appended drawings, in which:

FIGS. 6A-C show an example configuration of installing attachment brackets on the grilling unit for one or more accessories;

It will be noted that throughout the appended drawings, like features are identified by like reference numerals.

DETAILED DESCRIPTION

The present disclosure provides a cooking apparatus that allows for independent and simultaneous cooking styles at different temperatures. The cooking apparatus comprises both a grilling unit for grilling food, and a separate cooking chamber that can be configured for roasting/baking/smoking food, and the grilling unit and cooking chamber are operable independently and simultaneously. Advantageously, a user can cook both low and slow as well as hot and fast at the exact same time, all in a single appliance that is both aesthetically pleasing and compact, therefore providing a smaller footprint than alternative appliances that attempt to more simply aggregate multiple appliances. The design and configuration of the cooking apparatus and among other things the airflow design allows for two entirely contained heat sources/cooking areas within the confines of a single appliance without one impacting the temperature or functionality of the other.

Embodiments are described below, by way of example only, with reference to FIGS. 1A-10H.

Figures 1A, 1B, 1C:
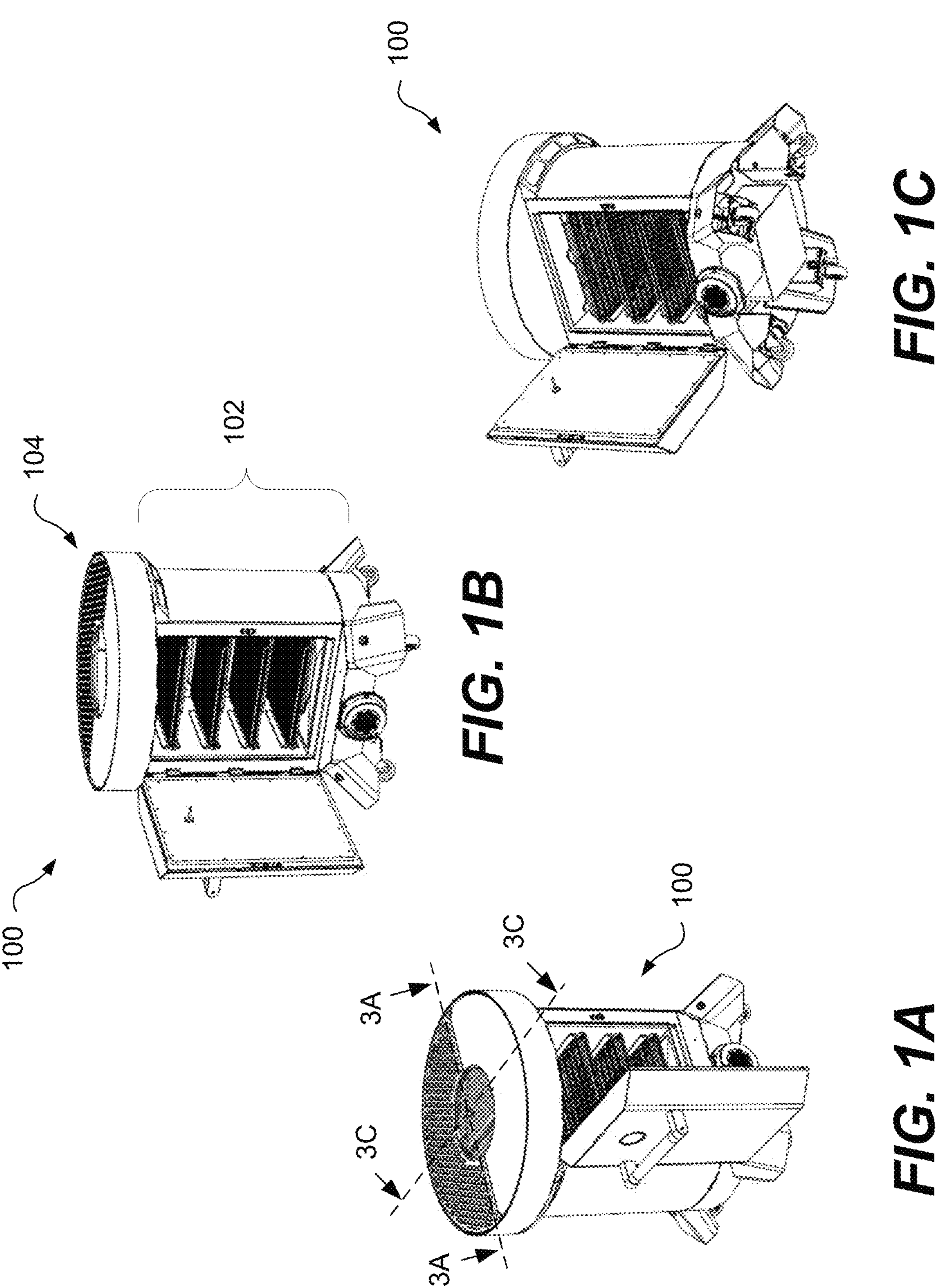
FIGS. 1A-C show perspective views of a cooking apparatus in accordance with the present disclosure from different viewpoints.

FIGS. 1A-C show perspective views of a cooking apparatus 100 in accordance with embodiments of the present disclosure from different viewpoints. As described in further detail below, the cooking apparatus 100 comprises a lower enclosure 102 that comprises a cooking chamber, and an upper portion 104 that comprises a grilling unit. The upper portion 104 and the lower enclosure 102 may be integrally formed (e.g. welded) or comprise separate components that are coupled to one another (e.g. bolted). Alternatively, some components of the upper portion 104 may be integrally formed with the lower enclosure 102 (e.g. a base of the upper portion, as described below) and other components of the upper portion may be coupled to said components. It will be appreciated that different configurations of the lower enclosure 102 and the upper portion 104 of the cooking apparatus 100 are possible, including different shapes and sizes of the lower enclosure 102 and upper portion 104 (e.g. rectangular instead of cylindrical). The lower enclosure 102 and upper portion 104 may be manufactured with a durable high heat matte black powder coat finish, as an example.

The cooking chamber and the grilling unit are operable independently and simultaneously. The cooking chamber of the lower enclosure 102 may be configured for roasting/baking/smoking food, while the grilling unit of the upper portion 104 is configured for grilling food. Accordingly, a user can use both the grilling unit and the cooking chamber at the same time to cook food with two methods and at two substantially different temperatures simultaneously. The grilling unit and cooking chamber may be configured to receive fuel sources to provide live-fire cooking (e.g. wood, charcoal, natural gas, propane) or may be electric. To provide both the grilling unit and cooking chamber with optimal cooking areas in the same compact space and thus provide a single unit with a small footprint, heat transfer between the grilling unit and the cooking chamber must be minimized and airflow to the cooking regions must be optimized, which is achieved by the design of the lower enclosure 102 and the upper portion 104 as described in more detail below. In some embodiments, the cooking apparatus may weigh approximately 500 lbs and have a height in the range of approximately 36" to 42", and a diameter in the range of approximately 29" to 35". In another embodiment, the cooking apparatus may be a smaller unit that is approximately 22" in diameter. However, these dimensions are non-limiting and are provided for the sake of example only. It will be appreciated that the dimensions of the cooking apparatus can also be scaled up and down.

Figures 2A, 2B:
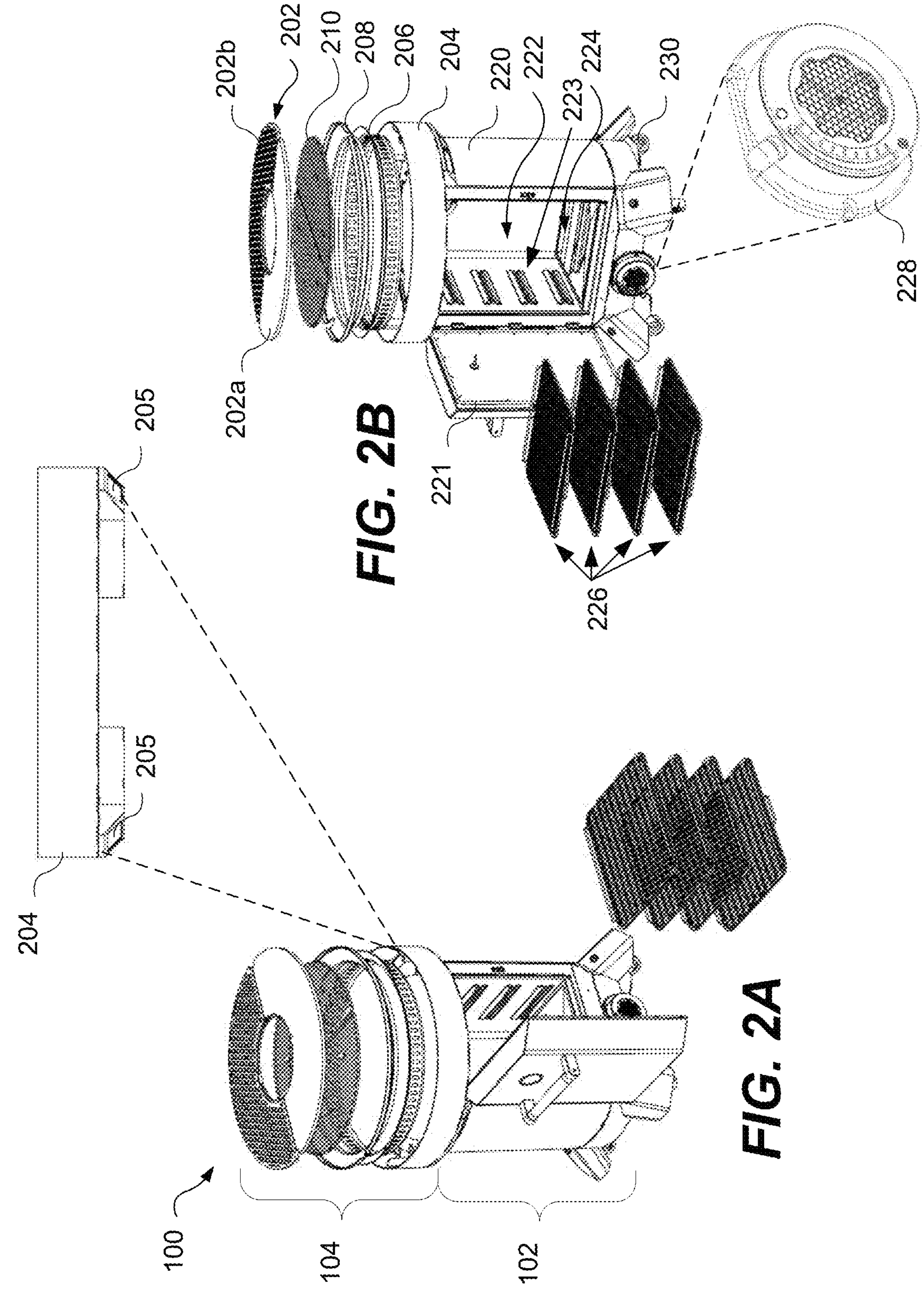
FIGS. 2A-B show exploded views of the cooking apparatus.

FIGS. 2A-B show exploded views of the cooking apparatus 100.

Referring to the upper portion 104, the cooking apparatus 100 comprises a grilling surface 202 for grilling food, providing a 360 degree cooking experience. While the grilling surface 202 is shown as being circular, it will be appreciated that alternative designs of the grilling surface 202 may also be used. The grilling surface 202 may comprise one or more interchangeable/removable grilling surface portions. For example, perforated and flat-iron grill plates may be interchangeable and can be swapped to suit the user's needs. In FIGS. 2A and 2B, the grilling surface 202 comprises a flat-iron plancha grilling portion *202a* and a perforated/diamond pattern grill grate *202b*. The grilling portion *202a* and grill grate *202b* may each be constructed of ½ inch 304 stainless steel, for example. Additional plates of each grilling surface portion can be used to transform the grilling surface 202 into a fully perforated or fully flat-iron configuration. Additionally, the grilling surface 202 comprises a hole in the center, which may allow for taller fuel sources such as wood stacks or coal stacks described below to be piled for burning before distribution of coals under the perimeter. Alternatively, a drop-in grilling surface portion may be added to the center hole to increase the grilling area. Various configurations of the grilling surface are therefore possible. In some embodiments (e.g. with a 29" to 35" diameter cooking apparatus), the grilling surface 202 of the grilling unit may provide approximately 600 to 850 square inches of grilling space. For example, the plancha grilling portion *202a* and the grill grate *202b* may each provide approximately 300 square inches of grilling area, and a central grill grate may provide an additional approximately 100 square inches of cooking space. However, it will be appreciated that the amount of grilling space can be scaled up and down.

A base 204 of the upper portion 104 is coupled to an upper region of the lower enclosure 102. An enlarged view of the base 204 is shown. The base 204 comprises an overhang that extends around a circumference or perimeter of the upper region of the lower enclosure 102, and the overhang comprises one or more air vents 205 distributed along the overhang for providing airflow. Given that the upper grilling area is open, air naturally flows through the air vents 205 distributed along the overhang.

An upper heat source region 206 is positioned within the base 204. In the cooking apparatus 100 shown in FIGS. 2A and 2B, the upper heat source region 206 comprises a basket configured for receiving a fuel source such as wood or charcoal. However, as described above other heat sources may be used in the grilling unit, such as natural gas or propane burners. The design of the base 204 with the one or more air vents 205 advantageously allows airflow to the upper heat source region 206 that enters from the circumference or perimeter of the base 204. The basket comprises air holes through which the air from the air vents enters into.

By distributing the one or more air vents 205 along the overhang, the venting is provided in a way so that grease/fat from the upper grilling area doesn't flow through and clog/restrict airflow. Further, a drip shield 208 may be provided, which extends around the circumference/perimeter of the upper heat source region 206 to direct grease/fat flows away from the one or more air vents 205 and towards the centre of the upper heat source region 206, which then for the most part burns off in the fire. An ash grate 210 may also be provided when charcoal is used as the fuel source, the ash grate 210 allowing ash to separate from the charcoal while its burning. The ash grate, drip shield, and basket (where the cooking apparatus uses a basket in the upper heat source region 206) may all be removable for cleaning.

The lower enclosure 102 comprises an outer wall 220 having a door 221 with a handle for providing access to the cooking chamber 222. A thermometer gauge may be located in the front of the door 221 and having a probe protruding through the door into the cooking chamber 222 to provide temperature readings. The door 221 may be provided with a striker-type standard oven door latch, using a notched pin and two spring rollers to pinch and hold the door to the pin.

The lower enclosure 102 may comprise a double wall design to improve heat retention. As shown in FIG. 2B, the cooking chamber 222 is defined by side walls 223, and the side walls 223 may be spaced apart from the outer wall 220 (as well as top and bottom outer surfaces) by an air gap (or other form of insulation), thus improving the heat retention in the cooking chamber 222. The upper region of the lower enclosure 102, for example between a top wall of the cooking chamber 222 and the base 204 of the upper region, may comprise thermal insulation to prevent heat transfer between the base 204 of the grilling unit and the cooking chamber 222.

A lower enclosure heat source region 224 is disposed in a bottom region of the cooking chamber 222. The heat source may be live-fire or electric, and the cooking chamber 222 may be used for roasting/baking/smoking food. One or more shelves 226 may be arranged within the cooking chamber 222 for supporting food being cooked. In some embodiments, the shelves 226 in the cooking chamber 222 provide approximately 1100 to 1300 square inches of cooking space, however it will be appreciated that the amount of cooking space can be scaled up and down. In the example of the cooking apparatus 100 shown in FIGS. 2A and 2B, the shelves 226 are perforated shelves. Airflow inlet/outlet dampers are arranged at a front and rear of the lower enclosure 102 to control airflow through the cooking chamber 222. An enlarged view of front inlet airflow damper 228 is shown in FIG. 2B. The airflow dampers may be adjusted (e.g. manually) to control a temperature within the cooking chamber 222, thus permitting the cooking chamber 222 to be used for roasting/baking/smoking without requiring modification. In the example of the cooking apparatus shown in FIGS. 2A-2B, the dampers comprise a handle that may be rotated around the perimeter of the damper to open a rotating vent system.

Further, a plurality of castors 230 may be arranged at a bottom portion of the lower enclosure 102. The castors 230 may be swivel castors and allow the cooking apparatus 100 to be moved around as needed. The castors 230 may be standard locking castors. The castors 230 may be designed to be raised and lowered (e.g. retractable). For example, a hex nut on the top face of each foot cover may be rotated to raise/lower the castors 230. The castors 230 may be completely or partially raised and lowered to assist with levelling the cooking apparatus 100 on uneven surfaces. When the castors are completely stored, the cooking apparatus may rest on a static foot that may form part of the castor housing. A rubber pad may be added to the bottom of the static foot.

Figure 3A:
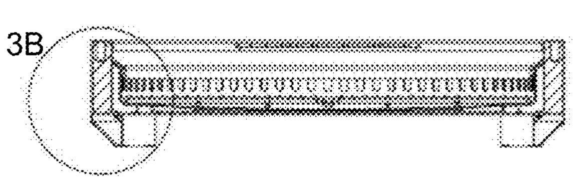
FIGS. 3A-D show cross-sectional views of the upper portion of the cooking apparatus.
Figure 3B:
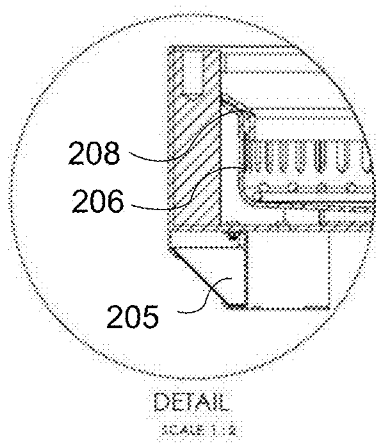
Figure 3C:
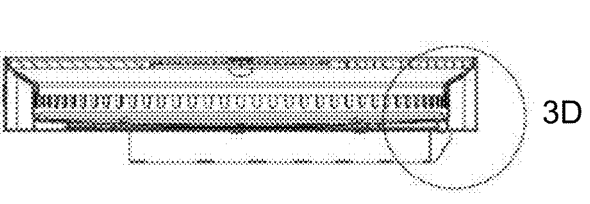
Figure 3D:
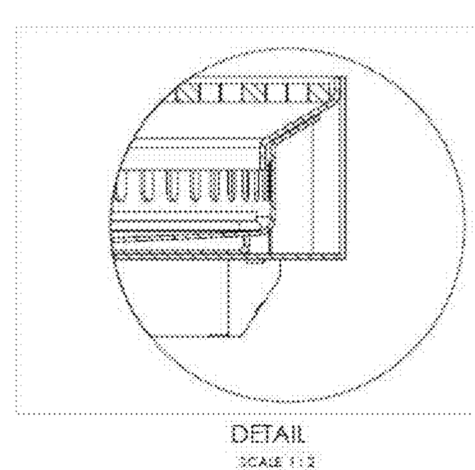

FIGS. 3A-D show cross-sectional views of the upper portion of the cooking apparatus. Specifically, FIGS. 3A and 3C show cross-sectional views taken along the lines 3A-3A and 3C-3C respectively in FIG. 1A. FIGS. 3B and 3D show enlarged views in the circle regions 3B and 3D of FIGS. 3A and 3C, respectively. FIGS. 3A to 3D show the air vents 205 distributed along the overhang of the base 204 of upper portion 104 for providing air flow to the upper heat source region 206. FIGS. 3A to 3D also show the configuration of the drip shield 208, which extends around the upper heat source region 206 for directing run-off from the grilling surface away from the air vents 205.

Figure 4B:
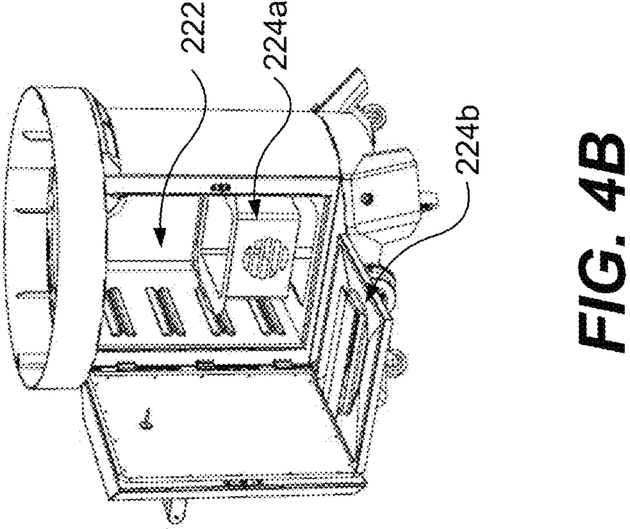
FIGS. 4A-B show a further exploded view of elements of the lower enclosure of the cooking apparatus.
Figure 4A:
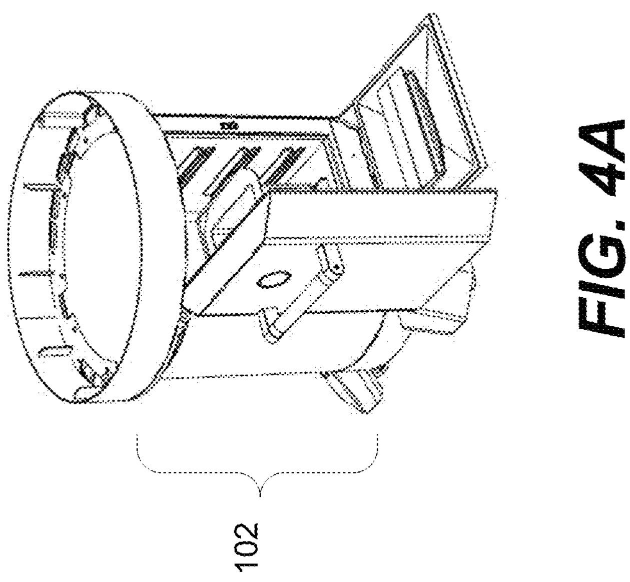

FIGS. 4A-B show a further exploded view of elements of the lower enclosure 102 of the cooking apparatus. Specifically, the lower enclosure heat source region 224 is shown as comprising a basket 224*a* and a diffuser 224*b*. The basket 224*a* is configured for receiving a fuel source such as wood or charcoal. Different fuel sources may be used depending on cooking method. For example, when the cooking chamber is used for roasting or baking a lighter wood may be used or a user may avoid using wood which may create additional smoke. The basket 224*a* may sit below the cooking chamber 222, and the diffuser 224*b* positioned above the basket 224*a* to deflect grease/fat drippings and prevent any flare ups/fires. The diffuser 224*b* may also be filled with water to add moisture to the cooking process. The basket 224*a* and diffuser 224*b* may be removable to allow ashes to be easily cleaned out. It will also be appreciated that instead of basket 224*a* for receiving a fuel source, gas burners or electric elements could be used in the lower enclosure heat source region.

Figure 5B:
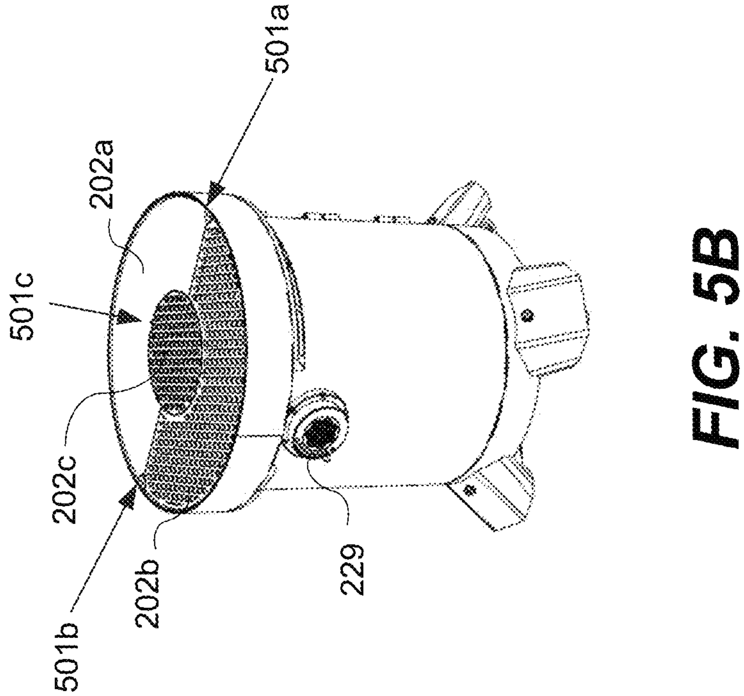
FIGS. 5A-B show perspective views of the cooking apparatus with one example configuration of the grilling surface.
Figure 5A:
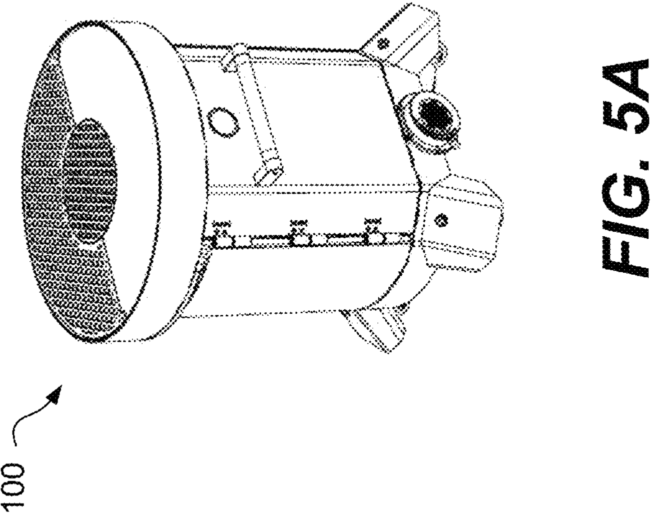

FIGS. 5A-B show perspective views of the cooking apparatus with one example configuration of the grilling surface. FIG. 5A shows a front perspective view of the cooking apparatus 100, and FIG. 5B shows a rear perspective view of the cooking apparatus 100. FIG. 5B also shows a rear outlet damper 229 on a rear side of the lower enclosure.

As described above, the grilling surface may comprise one or more removable/configurable grilling surface portions. As shown in FIGS. 5A and 5B, the grilling surface comprises a flat-iron plancha grilling portion 202*a*, a perforated/diamond pattern grill grate 202*b*, and a central grill grate 202*c* (i.e. covering the hole in the center of the grilling surface 202 shown in FIGS. 2A and 2B). The central grill grate 202*c* may be a drop-in configuration, with the grilling portion 202*a* and grill grate 202*b* providing a lip around the circumference of the hole for receiving the central grill grate 202*c*. The central grill grate 202*c* may be constructed with a slightly thinner material than the grilling portion 202*a* and grill grate 202*b*, such as a ¼ inch 304 stainless steel, for example.

Additionally, the grilling surface may comprise one or more attachment points, which allow for attaching brackets for various accessories that could be added to the grilling unit. The attachment points 501*a*, 501*b*, and 501*c* may be provided in the grilling surface portions themselves (i.e. grilling portion 202*a* and/or grill grate 202*b*), or may extend from the base of the upper portion. In FIGS. 5A and 5B, attachment points 501*a* and 501*b* are provided on an outer perimeter of the grilling surface and may extend from the base of the upper portion, and attachment point 501*c* is provided on an inner perimeter of the grilling surface (i.e. at the perimeter of the hole defined by the grilling surface, in this configuration near the central grill grate 202*c*) and provided on grill portion 202*a*.

FIGS. 6A-C show an example configuration of installing attachment brackets on the grilling unit for one or more accessories. The grilling unit may comprise one or more accessories, which may be attached to the grilling unit using one or more attachment brackets fastened to the attachment points. The attachment bracket may be a universal attachment bracket fastened with a fastener to allow various accessories to be attached to the attachment points on the grilling surface. The attachment points allow for attachment of the fasteners (e.g. screw fasteners) for fastening the attachment bracket to install accessories to the grill.

As seen in FIG. 6A, two attachment brackets 602 are provided for the grilling surface. FIGS. 6B and 6C show detailed views of the attachment brackets, where FIG. 6B provides an exploded view showing fastener 603. It will be appreciated that additional attachment brackets could be implemented for the grilling unit, and that these can be provided at different locations to facilitate attachment of different accessories.

Figures 7A, 7B:
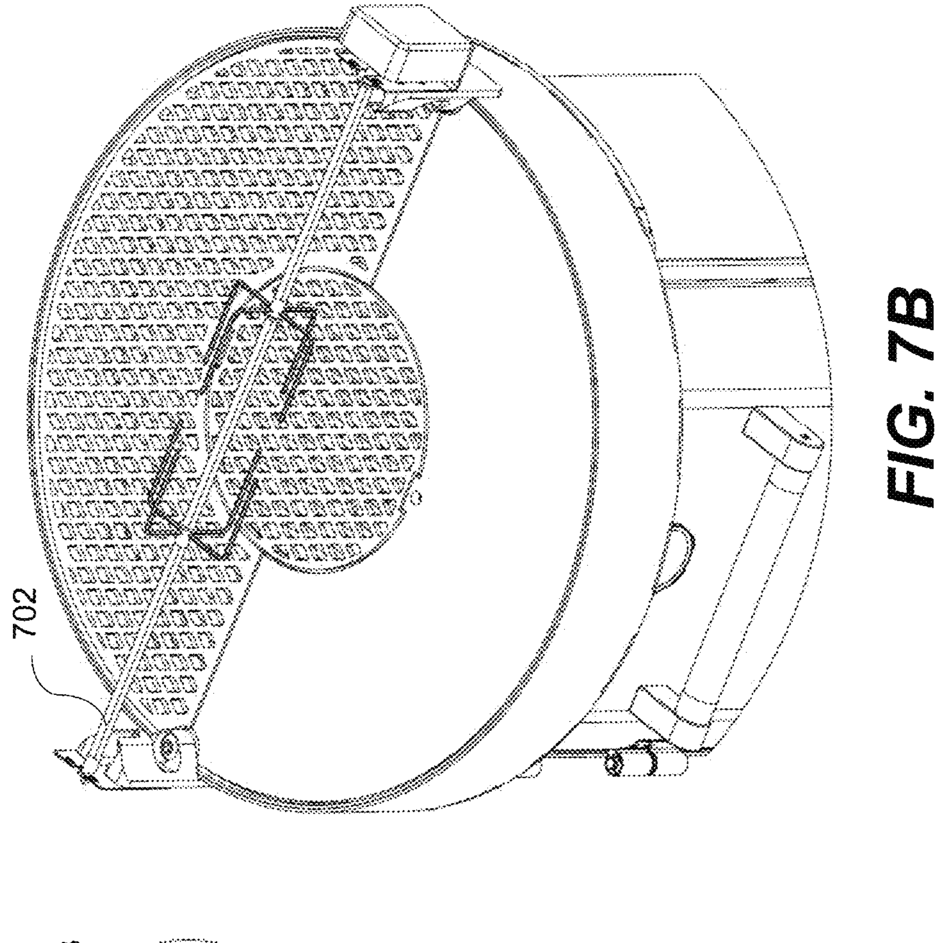
FIGS. 7A-B show a first exemplary accessory attached to the grilling unit.

FIGS. 7A-B show a first exemplary accessory attached to the grilling unit. Specifically, FIGS. 7A-B show an example of a rotisserie accessory 702 coupled to the attachment brackets.

Figure 8B:
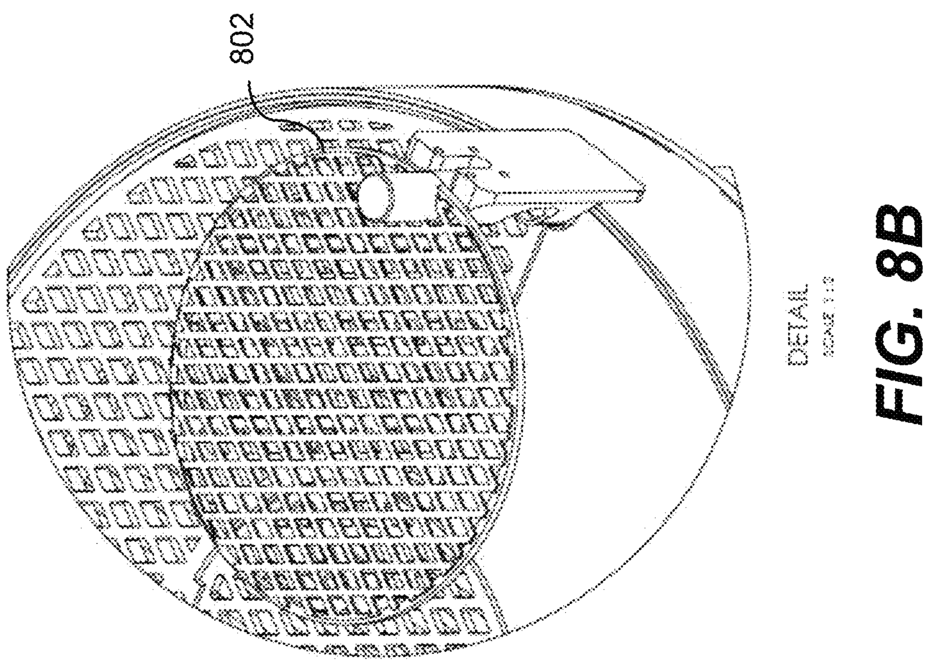
FIGS. 8A-B show a second exemplary accessory attached to the grilling unit.
Figure 8A:
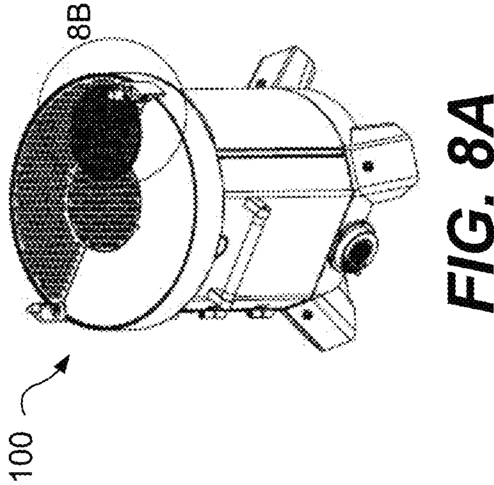

FIGS. 8A-B show a second exemplary accessory attached to the grilling unit. In FIGS. 8A-B, a single attachment bracket is used for coupling a swing-away griddle platform 802. The attachment bracket and swing-away griddle platform 802 may be implemented at the outer perimeter of the grilling surface (i.e. as shown in FIGS. 8A-B), or may be implemented at an inner perimeter of the grilling surface (e.g. at the perimeter of the hole in the grilling surface).

Figure 9B:
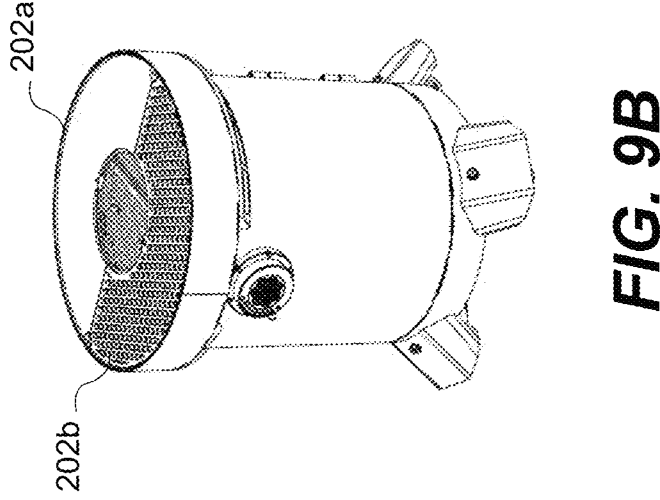
FIGS. 9A-B show perspective views of the cooking apparatus with another example configuration of the grilling surface.
Figure 9A:
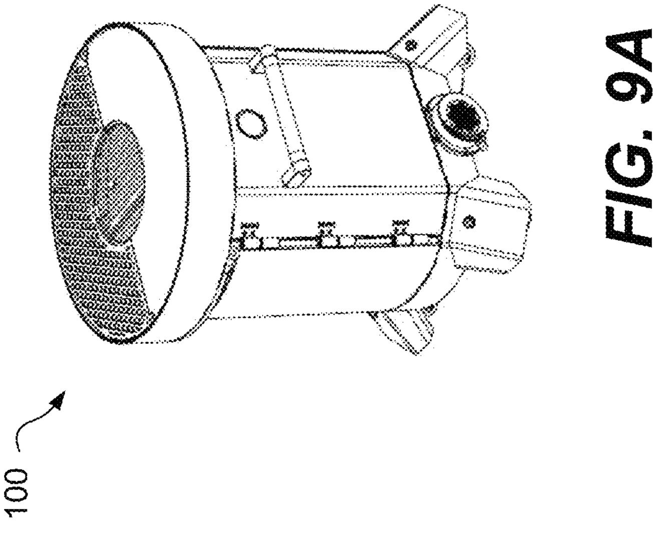

FIGS. 9A-B show perspective views of the cooking apparatus with another example configuration of the grilling surface. The grilling surface in FIGS. 9A-B is similar to that as in FIGS. 5A-B in that the grilling surface comprises a flat-iron plancha grilling portion 202*a* and a perforated/diamond pattern grill grate 202*b*, however in FIGS. 9A-B the central grill grate is removed. It will be appreciated that various attachment brackets and accessories can be added to the grilling surface.

Figure 10B:
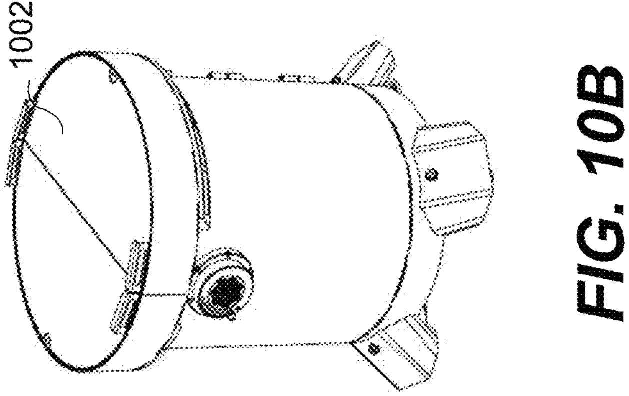
FIGS. 10A-H show views of the cooking apparatus with the grilling surface covered by a lid.
Figure 10A:
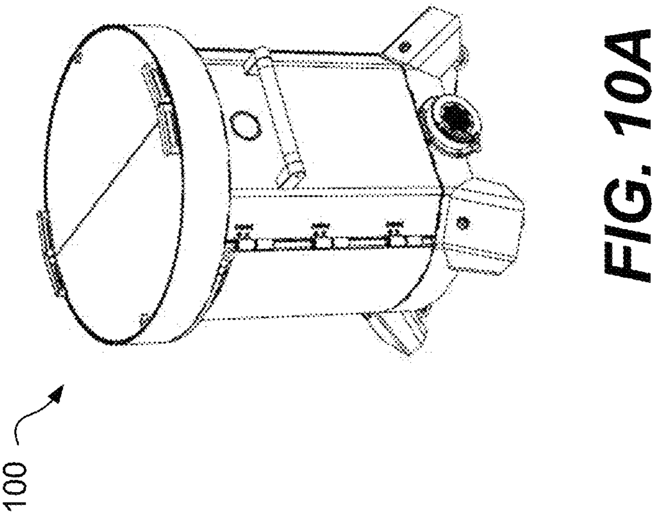

FIGS. 10A-H show views of the cooking apparatus with the grilling surface covered by a lid. FIGS. 10A and 10B show perspective views with the grilling surface covered by lid 1002. The top of the grilling surface may be covered by the lid 1002, which may be made of metal or some other material, when not in use (i.e. as a protective lid, not for snuffing out fire). The lid may have one or more handles to facilitate installation/removal of the lid.

Figures 10C, 10D, 10E, 10F, 10G, 10H:
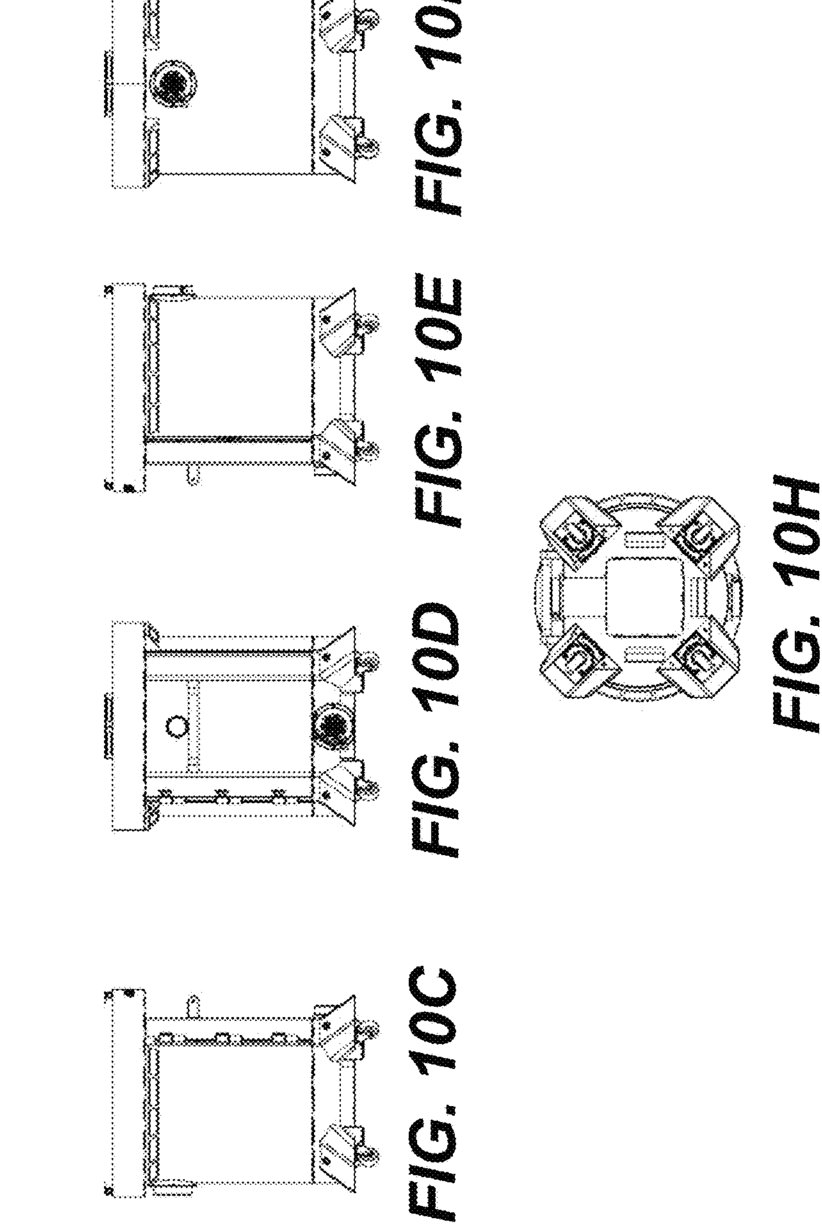

FIG. 10C shows a left side view of the cooking apparatus, FIG. 10D shows a front view of the cooking apparatus. FIG. 10E shows a right side view of the cooking apparatus. FIG. 10F shows a rear view of the cooking apparatus. FIG. 10G shows a top view of the cooking apparatus. FIG. 10H shows a bottom view of the cooking apparatus.

It would be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A cooking apparatus, comprising:

a lower enclosure comprising a cooking chamber; and an upper portion arranged above the lower enclosure and comprising a grilling unit, the grilling unit comprising:

a base that is coupled to an upper region of the lower enclosure;

an upper heat source region positioned within the base; and a grilling surface arranged above the upper heat source region;

wherein the base of the upper portion comprises an overhang that extends around a circumference or perimeter of the upper region of the lower enclosure, and the overhang comprises one or more air vents distributed along the overhang for providing airflow to the upper heat source region, and wherein the grilling unit and the cooking chamber are operable independently and simultaneously and provide two separate cooking areas without one cooking area impacting a temperature or functionality of another cooking area.

2. The cooking apparatus of claim 1, wherein the upper heat source region comprises a basket configured for receiving a fuel source.

3. The cooking apparatus of claim 2, wherein the fuel source comprises wood or charcoal.

4. The cooking apparatus of claim 1, wherein the upper region of the lower enclosure comprises thermal insulation to limit heat transfer between the base and the cooking chamber.

5. The cooking apparatus of claim 1, further comprising a drip shield configured to direct run-off from the grilling surface away from the one or more air vents.

6. The cooking apparatus of claim 1, wherein the grilling unit further comprises a grate disposed between the upper heat source region and the grilling surface.

7. The cooking apparatus of claim 1, wherein the grilling surface comprises one or more removable grilling surface portions.

8. The cooking apparatus of claim 1, further comprising a lower enclosure heat source region in a lower portion of the cooking chamber.

9. The cooking apparatus of claim 8, wherein the cooking chamber is configured for smoking food.

10. The cooking apparatus of claim 9, wherein the lower enclosure heat source region comprises a fuel box for receiving wood or charcoal.

11. The cooking apparatus of claim 8, wherein the cooking chamber further comprises a diffuser arranged above the lower enclosure heat source region.

12. The cooking apparatus of claim 1, wherein the lower enclosure comprises an inlet and outlet air damper coupled to the cooking chamber.

13. The cooking apparatus of claim 1, wherein the lower enclosure comprises an outer wall, and wherein the cooking chamber is separated from the outer wall by an air gap surrounding the cooking chamber.

14. The cooking apparatus of claim 1, further comprising a plurality of castors arranged at a bottom portion of the lower enclosure, and wherein the plurality of castors are configured to be raised and lowered.

15. The cooking apparatus of claim 1, wherein the grilling surface provides 600 to 850 square inches of grilling space.

16. The cooking apparatus of claim 1, wherein the cooking chamber comprises one or more shelves.

17. The cooking apparatus of claim 16, wherein the one or more shelves provide 1100 to 1300 square inches of cooking space.

18. The cooking apparatus of claim 1, wherein the grilling surface comprises one or more attachment points for installation of one or more accessories.

19. The cooking apparatus of claim 18, wherein the attachment points are configured for receiving an attachment bracket, and the one or more accessories are configured to be coupled to the attachment bracket.

20. The cooking apparatus of claim 18, wherein the one or more accessories comprise one or more of a rotisserie accessory and a swing-away griddle platform.

21. The cooking apparatus of claim 1, wherein the grilling surface comprises a plancha grilling portion.

22. The cooking apparatus of claim 1, wherein the grilling surface comprises a grill grate.

23. The cooking apparatus of claim 1, wherein the grilling surface comprises a plancha grilling portion and a grill grate.

* * * * *